(12) United States Patent
Hecht et al.

(10) Patent No.: US 10,471,517 B2
(45) Date of Patent: Nov. 12, 2019

(54) CUTTING TOOL AND CUTTING TOOL BODY WITH A HOLDING MEMBER FOR HOLDING A COUPLING SCREW

(71) Applicant: ISCAR LTD., Tefen (IL)

(72) Inventors: Gil Hecht, Nahariya (IL); Rajat Sharma, Shimla (IN)

(73) Assignee: ISCAR LTD., Tefen (IL)

( * ) Notice: Subject to any disclaimer, the term of this patent is extended or adjusted under 35 U.S.C. 154(b) by 119 days.

(21) Appl. No.: 15/652,475

(22) Filed: Jul. 18, 2017

(65) Prior Publication Data

US 2019/0022764 A1   Jan. 24, 2019

(51) Int. Cl.
| | | |
|---|---|---|
| *B23B 27/16* | (2006.01) | |
| *F16B 35/00* | (2006.01) | |
| *F16B 41/00* | (2006.01) | |
| *B23B 29/04* | (2006.01) | |

(52) U.S. Cl.
CPC ...... *B23B 27/1614* (2013.01); *B23B 27/1622* (2013.01); *B23B 29/043* (2013.01); *F16B 35/005* (2013.01); *F16B 41/002* (2013.01); *B23B 2205/04* (2013.01); *B23B 2205/10* (2013.01); *B23B 2205/12* (2013.01); *B23B 2260/124* (2013.01); *B23B 2260/138* (2013.01)

(58) Field of Classification Search
CPC ............ B23B 27/1614; B23B 2205/04; B23B 225/10; B23B 2260/124; B23B 27/1622; B23B 29/043; B23B 2205/12; B23B 2260/138; F16B 41/002; F16B 35/005
See application file for complete search history.

(56) References Cited

U.S. PATENT DOCUMENTS

| | | | | |
|---|---|---|---|---|
| 2,861,618 A | * | 11/1958 | Tinnerman | ............ F16B 37/041 411/103 |
| 3,520,042 A | | 7/1970 | Stier | |
| 3,584,667 A | | 6/1971 | Reiland | |
| 3,758,927 A | * | 9/1973 | Stein | ...................... B23B 27/04 407/101 |

(Continued)

FOREIGN PATENT DOCUMENTS

| | | |
|---|---|---|
| DE | 18 01 566 A1 | 8/1969 |
| FR | 1 361 649 A | 5/1964 |
| FR | 2 862 245 A1 | 5/2005 |

OTHER PUBLICATIONS

International Search Report dated Oct. 19, 2018 for International Patent Application No. PCT/IL2018/50696 (5 pages).

(Continued)

*Primary Examiner* — Sara Addisu
(74) *Attorney, Agent, or Firm* — Smith, Gambrell & Russell, LLP

(57) ABSTRACT

A cutting tool body is configured for securing a cutting insert with a female thread. The cutting tool body includes a machining end and a tool peripheral surface which extends therefrom. The cutting tool body further includes a through, non-threaded tool coupling bore which opens out to the tool peripheral surface and a coupling screw which has a coupling screw thread. The coupling screw is being located in the tool coupling bore and configured to secure the cutting insert. The cutting tool body further includes a holding member which engages the coupling screw thread at least when the holding member is not in contact with the cutting insert.

26 Claims, 5 Drawing Sheets

(56) References Cited

U.S. PATENT DOCUMENTS

| | | | | |
|---|---|---|---|---|
| 3,996,651 A | * | 12/1976 | Heaton | B23B 27/1662 407/104 |
| 4,096,613 A | | 6/1978 | Takacs et al. | |
| 4,730,525 A | * | 3/1988 | Kelm | B23B 27/00 29/39 |
| 4,790,703 A | * | 12/1988 | Wing | F16B 39/28 411/260 |
| 5,688,080 A | * | 11/1997 | Hedlund | B23B 27/04 407/101 |
| 5,733,073 A | * | 3/1998 | Zitzlaff | B23B 27/16 407/102 |
| 5,779,400 A | | 7/1998 | Fountaine | |
| 5,863,156 A | * | 1/1999 | Satran | B23C 5/2221 407/36 |
| 5,921,724 A | * | 7/1999 | Erickson | B23B 27/04 407/109 |
| 6,010,289 A | * | 1/2000 | DiStasio | C07C 213/10 411/174 |
| 6,074,146 A | * | 6/2000 | Soemer | F16B 5/0208 411/107 |
| 6,186,704 B1 | * | 2/2001 | Hale | B23B 27/04 407/101 |
| 7,094,006 B2 | | 8/2006 | Hecht | |
| 7,641,429 B2 | * | 1/2010 | DiStasio | F16B 39/32 411/114 |
| 2004/0022592 A1 | * | 2/2004 | Inayama | B23B 27/08 407/117 |
| 2004/0047707 A1 | * | 3/2004 | Lauchner | F16B 39/04 411/204 |
| 2009/0035074 A1 | * | 2/2009 | Craig | B23B 27/1629 407/40 |
| 2010/0230936 A1 | * | 9/2010 | Bonarens | B60R 21/213 280/728.2 |
| 2011/0020073 A1 | * | 1/2011 | Chen | B23B 27/10 407/11 |
| 2011/0293382 A1 | * | 12/2011 | Chistyakov | B23B 27/04 407/70 |
| 2015/0377277 A1 | * | 12/2015 | Downey | F16B 37/0842 411/519 |
| 2017/0151612 A1 | | 6/2017 | Hecht et al. | |

OTHER PUBLICATIONS

Written Opinion of the International Search Authority dated Oct. 19, 2018 for International Patent Application No. PCT/IL2018/50696 (6 pages).

* cited by examiner

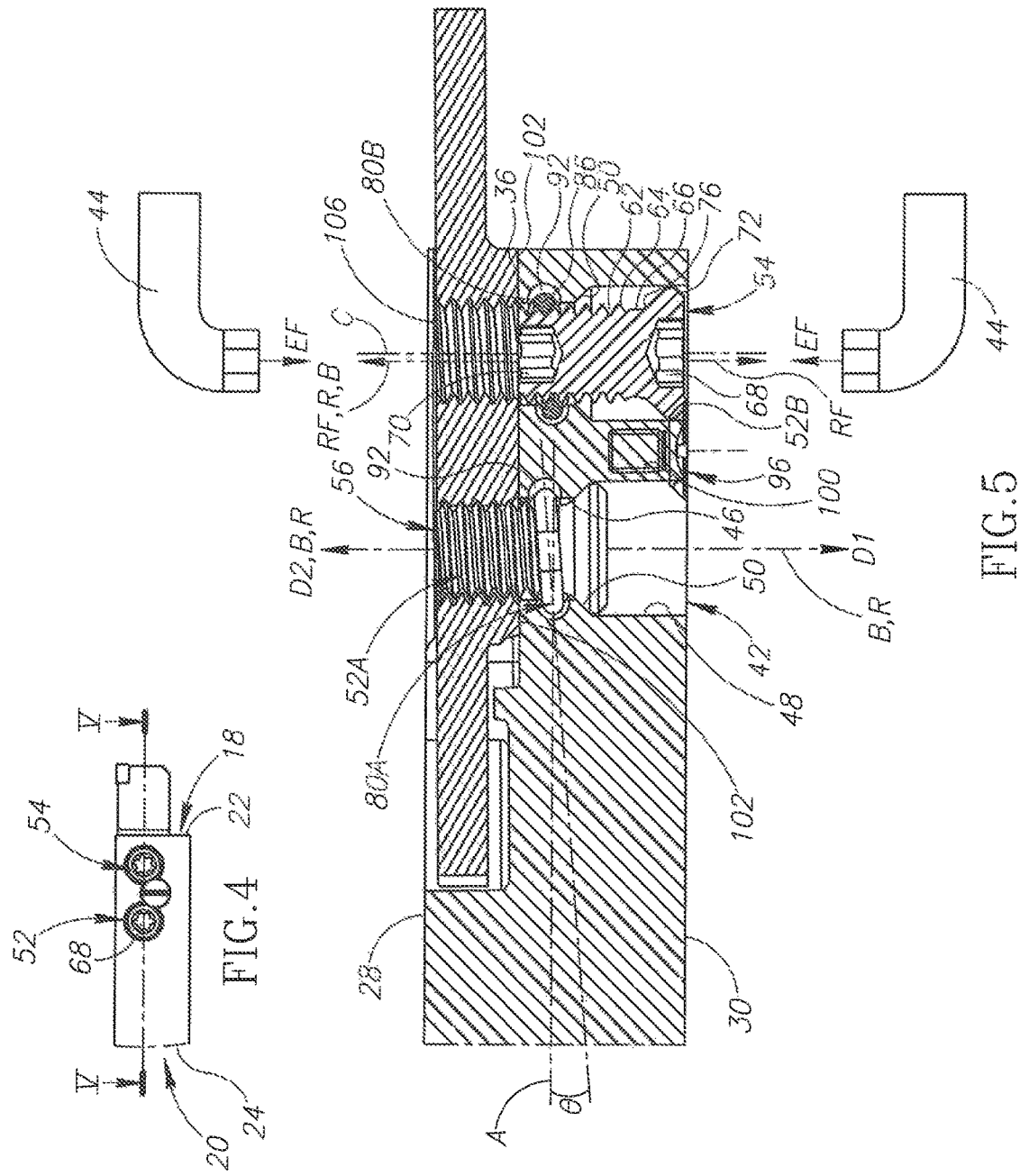

CUTTING TOOL AND CUTTING TOOL BODY WITH A HOLDING MEMBER FOR HOLDING A COUPLING SCREW

FIELD OF THE INVENTION

The subject matter of the present application relates to cutting tools. Specifically, it relates to cutting tools with at least one cutting insert which includes a female thread.

BACKGROUND OF THE INVENTION

U.S. Pat. No. 7,094,006 discloses a swiss-type turning tool which enables driving tool access from two opposite sides of the turning tool.

SUMMARY OF THE INVENTION

In accordance with a first aspect of the subject matter of the present application there is provided a cutting tool body configured for securing a cutting insert having a female thread and comprising:

a machining end and a tool peripheral surface extending therefrom;

a through, non-threaded tool coupling bore opening out to the tool peripheral surface; and a coupling screw having a coupling screw thread and being located in the tool coupling bore and configured to secure the cutting insert;

wherein, the cutting tool body further includes a holding member which engages the coupling screw thread at least when the holding member is not in contact with the cutting insert.

In accordance with a second aspect of the subject matter of the present application there is further provided a cutting tool body configured for securing a cutting insert having a female thread and comprising:

a machining end and a tool peripheral surface extending therefrom;

a through, non-threaded tool coupling bore opening out to the tool peripheral surface;

the tool coupling bore of the cutting tool body being configured to receive a coupling screw having a coupling screw thread that is receivable in the female thread of the cutting insert; and the cutting tool body further comprising a holding member configured for engagement with the coupling screw thread.

In accordance with a third aspect of the subject matter of the present application there is further provided a cutting tool body configured for securing a cutting insert having a female thread and comprising:

a machining end and a tool peripheral surface extending therefrom;

a through, non-threaded tool coupling bore opening out to the tool peripheral surface;

the tool coupling bore of the cutting tool being configured to receive a coupling screw having a coupling screw thread that is receivable in the female thread of the cutting insert; and the cutting tool body further comprising holding means for holding engagement with the coupling screw thread while in the tool cutting body.

Any of the following features, either alone or in combination, may be applicable to any of the above aspects of the subject matter of the application:

The holding member is configured to prevent the coupling screw from falling out of the tool coupling bore, and prevent it from moving away from a driving tool during turning.

The tool peripheral surface includes a pocket in which the cutting insert is seated, the pocket includes an outwardly facing pocket base surface and first and second support walls which extend from the pocket base surface.

The holding member applies a reaction force RF on the coupling screw in a direction of a coupling screw rotation axis R which is equal or lower than a maximum holding force MHF which can cause plastic deformation in either the coupling screw or the holding member.

When RF=MIHF, the holding member is configured to move, or jump, between thread recesses of the coupling screw thread to allow axial motion without rotation of the coupling screw.

The coupling screw includes first and second driving members which enable turning the coupling screw via a driving tool from two opposite sides of the cutting tool.

The holding member can protrude into the tool coupling bore.

The holding member can be non-elastic, and resiliently secured to the cutting tool via an elastic member.

The holding member can be elastic.

The holding member can be U-shaped or straight.

At least portions of the holding member can have a triangular, or circular, cross-section.

The holding member is replaceable and can be releasably located within a through holding bore which intersects the tool coupling bore.

The holding member replaceable and can be releasably located within a holding recess in the tool coupling bore.

The cutting tool body can include a locking screw which is threaded into a blind locking bore opening out only to the tool peripheral surface.

The coupling screw does not protrude outwardly from the tool peripheral surface.

The cutting tool body can include two coupling screws and two tool coupling bores.

The cutting tool body can include two coupling screws and a single holding member which engages both coupling screws at least in a non-secured position.

A cutting tool includes the cutting tool body and a cutting insert secured in a pocket of the cutting tool body via the coupling screw.

The tool peripheral surface includes the pocket in which the cutting insert is seated, the pocket includes an outwardly facing pocket base surface and support walls which extend therefrom;

the cutting insert includes opposite insert base surfaces and an insert peripheral surface which extends therebetween.

In a secured position, one of the insert base surfaces abuts the pocket base surface, the insert peripheral surface abuts the first and second support walls and the coupling screw is screw threaded into the female thread and tightened against a coupling bore chamfer.

The coupling bore chamfer extends radially inward within an intermediate region of the tool coupling bore to define a contact location for a coupling screw head of the coupling screw.

The tool coupling bore can be dimensioned such that the coupling screw is retained, in its entirety, within the tool coupling bore in a non-secured position.

A method of indexing or replacing a cutting insert received in the pocket of the cutting tool body (12); the method comprising the steps of:

a. unscrewing, with a driving tool, at least one coupling screw (52) threadably received within a female thread of the cutting insert from a secured to a non-secured position;
b. inserting a replacement cutting insert, or indexing the previously secured cutting insert;
c. screwing the coupling screw from the non-secured position to a secure position wherein the coupling screw is threadably engaged in a corresponding female thread in the cutting insert, and wherein a holding member is in engagement with coupling screw thread at least when the coupling screw is in the non-secured position.

The method can further include non-rotational axial movement of the coupling screw, whereby the holding member adjusts relative to the coupling screw.

The tool coupling bore is dimensioned such that the coupling screw is fully retained within the tool coupling bore when the coupling screw is in the non-secured position.

BRIEF DESCRIPTION OF THE DRAWINGS

For a better understanding of the subject matter of the present application and to show how the same may be carried out in practice, reference will now be made to the accompanying drawings, in which:

FIG. 4 is a plan view of the tool second surface of the cutting tool of FIG. 1;

FIG. 5 a cross-sectional view taken along line V-V of FIG. 4 showing two coupling screws, in respective secured and non-secured positions;

Figure 1:
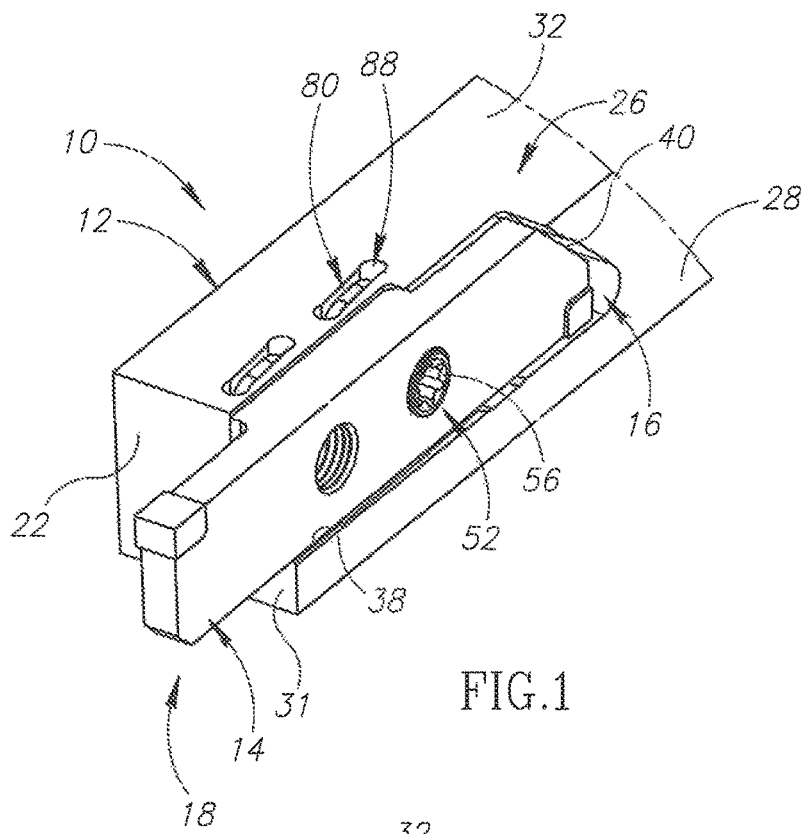
FIG. 1 is a first isometric view of a first embodiment of a cutting tool showing at least a tool first surface with driving tool access and two U-shaped holding members.

Where considered appropriate, reference numerals may be repeated among the figures to indicate corresponding or analogous elements (inclusive of repeating base reference numbers with added different hundred digits relative to different embodiments).

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
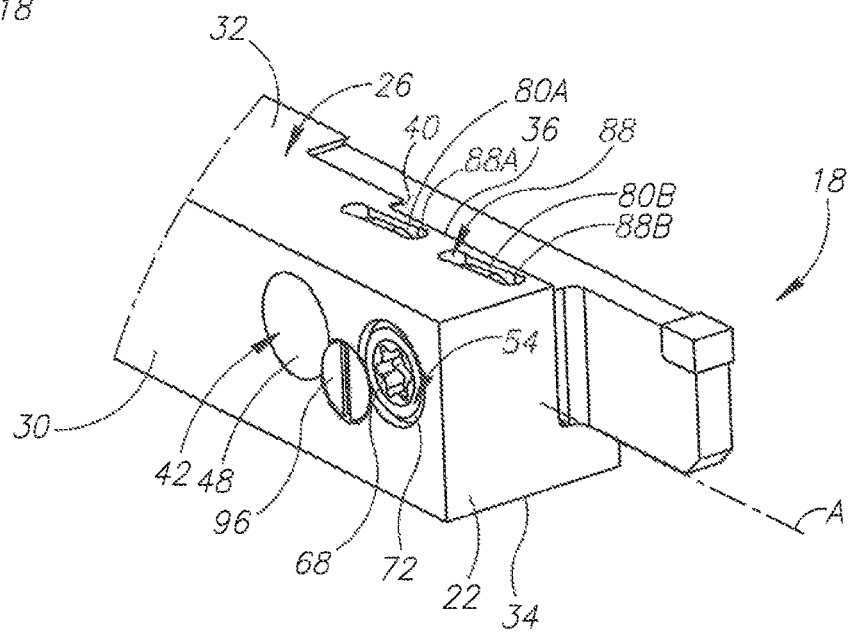
FIG. 2 is a second isometric view of the cutting tool of FIG. 1, showing an opposite tool second surface with driving tool access.

Attention is drawn to FIGS. 1 and 2. A cutting tool 10 includes a cutting tool body 12 and a cutting insert 14 secured in a pocket 16 formed in the cutting tool body 12. The cutting tool body 12 has opposite machining and clamping ends 18, 20 (FIG. 4). The machining end 18 has a tool front surface 22, and the clamping end 20 has a tool rear surface 24. The cutting tool body 12 further includes a tool peripheral surface 26 which extends between the tool front and rear surfaces 22, 24.

The cutting tool 10 has an elongated shape and a central tool axis A which extends longitudinally therealong and passes through the machining and clamping ends 18, 20 and through the tool front and rear surfaces 22, 24. The tool peripheral surface 26 extends along the direction of the tool axis A. The tool peripheral surface 26 can include opposite tool first and second surfaces 28, 30. The tool peripheral surface 26 can further include opposite tool third and fourth surfaces 32, 34 which extend respectively between the tool first and second surfaces 28, 30 (e.g., as to form, in a cross section perpendicular to axis A, a polygonal (as in square) peripheral configuration in the peripheral surface 26).

The pocket 16 can represent a recessed region formed inward relative to an outer peripheral configuration of the peripheral surface 26. According to some embodiments, the pocket 16 is located in the tool first surface 28 (e.g., extends inward relative to the outer peripheral portion represented by the tool first surface 28) and opens out to both the tool front surface 22 and to the tool third surface 32. The pocket 16 includes a pocket base surface 36 which extends along the tool axis A in a manner, according to some embodiments, that is parallel to the tool first surface 28. The pocket base surface 36 faces radially outwardly, and away from (and to one side of) the tool axis A. The pocket base surface 36 can be located closer to the tool first surface 28 than the tool second surface 30. The pocket base surface 36 can face away from the tool second surface 30. The pocket 16 can include first and second support walls 38, 40 which extend transversely away from the pocket base surface 36. According to some embodiments, the first and second support walls 38, 40 form an acute angle therebetween. The first and second support walls 38, 40 can be perpendicular to the pocket base surface 36. According to some embodiments, only the support walls 38, 40 and the pocket base surface 36 abut the cutting insert 14.

The cutting tool body 12 further includes one or more through tool coupling bores 42 as in, for example, one, two, or three coupling bores 42. According to some embodiments, the cutting tool body 12 includes two through tool coupling bores 42 which open out to the pocket 16 (e.g., at the base surface 36) and to the tool peripheral surface 26 (e.g., at the tool second surface 30). Each tool coupling bore 42 has a central, longitudinal coupling bore axis B (see FIG. 5). In the embodiment shown in the figures, the tool coupling bores 42 open out to the pocket base surface 36 and to the tool second surface 30; with, for this embodiment, each coupling bore opening out at a location closer to the machining end 18 than the coupling end 20. The tool coupling bores 42 are non-threaded, since they are not configured to correspond to a male screw thread. The tool coupling bores 42 (42A and 42B) are through bores, to allow driving tool 44 (see FIG. 5) access from two opposite sides of the cutting tool body 12. Each tool coupling bore 42 has a narrow portion 46 and a wide portion 48 which has a larger diameter than the narrow portion 46. The wide portion 48 is connected to the narrow portion 46 via a transition coupling bore chamfer 50.

The cutting tool 10 further includes one or more coupling screws 52 as in, for example, one, two, or three coupling screws 52 (as in one coupling screw 52 for each coupling bore 42). In embodiments such as that shown in FIG. 5, the cutting tool body 12 can include exactly two coupling screws 52 (52A and 52B), each located in a tool coupling bore 42. Each coupling screw 52 has a longitudinally extending central, coupling screw rotation axis R which, in the embodiment shown on the left side of FIG. 5 (which shows the coupling screw in the secured position), is coaxial with the coupling bore axis B. Within commonly accepted production tolerances, when the coupling screw 52 is located within the tool coupling bore 42 (in the non-secured position as shown in the right side of FIG. 5), it can only move axially along the coupling bore axis B, and it can freely rotate about the coupling screw rotation axis R. Each coupling screw 52 has opposite first and second screw end surfaces 54, 56. Each coupling screw 52 has a coupling screw head 58 which extends from the first screw end surface 54 and connects with a coupling screw thread 60 which extends from the second screw end surface 56. In a side view or cross section of the coupling screw thread 60 (FIG. 5), the coupling screw thread 60 has alternating thread recesses and protrusions 62, 64. The coupling screw 52 can include a coupling screw neck 66, which connects the coupling screw head 58 with the coupling screw thread 60.

The coupling screw head 58 can include a first driving member 68 which is located in the first screw end surface 54. The coupling screw head 58 includes a coupling screw locking surface 72 which faces away from the coupling screw thread 60 (and thus the locking surface 72 falls on an opposite side of neck 66 than screw thread 60 along the rotation axis R). The coupling screw locking surface 72 is configured to abut a locking screw 74 as will be further explained below. The coupling screw head 58 includes a coupling screw abutment surface 76 which is located opposite the coupling screw locking surface 72 and faces away therefrom. The coupling screw 52 includes a second driving member 70 which is located in the second screw end surface 56. The first and second driving members 68, 70 can have, e.g., TORX™, or ALLEN™ standard geometries. The first and second driving members 68, 70 can be either recesses or protrusions.

Attention is drawn to FIGS. 1, 2 and 5. The coupling screw 52, in its entirety, is always located within the tool peripheral surface 26. Put differently, the coupling screw 52 never protrudes outwardly from the the tool peripheral surface 26, unless it is being replaced with, e.g., a replacement coupling screw 52. This is advantageous because in some machines, the cutting tool 10 is secured within the machine, while only a single tool side is accessible for driving tools 44. In these scenarios, depending on the type of machine, the cutting tool 10 can be used, or secured in the machine in two opposite orientations, since the coupling screw/s 52 can be turned via either the first or second driving members 68, 70. In some embodiments, in a non-secured position (as will be explained below), the coupling screw 52 is located in its entirety within the tool coupling bore 42 (subsequently—the coupling screw 52 can have the same length or less than the tool coupling bore 42). This is advantageous in scenarios when the insert can be removed from the pocket only in the direction of the tool axis A (i.e., tool access only exists from a side of the cutting tool body 12—opposite of the cutting insert 14). Furthermore, according to some embodiments, the first and second driving members 68, 70 can be of identical configuration as to provide for a single driving tool or key design (such as the driving tool 44) to be equally applicable in use on either side of the coupling screw 52.

The cutting tool body 12 further includes one or more holding members 80. The holding member/s 80 provide means for holding the coupling screw 52 in a desired, non-binding relative position within the cutting tool body 12 as described in greater detail below. In FIG. 5 there is shown two holding members 80 (80A and 80B) one associated with each coupling screw 52, although as described below the holding means 80 of the present invention can take on other forms and relationships with the coupling screw/s 52. FIG. 5 (right-side) shows that when a coupling screw 52 is in a non-secured or non-inserted position, the coupling screw abutment surface 76 is spaced apart from the coupling bore chamfer 50 and the coupling screw 52 does not contact the cutting insert 14. As further shown in the right side of FIG. 5, when the coupling screw 52B is in the non-secured position, the holding member or means for holding 80B engages the coupling screw thread 60 of the coupling screw 52B. Put differently, the holding member 80 is located at least partially in at least one thread recess 62 of the coupling screw thread 60. With reference to the left side of FIG. 5, there is seen the coupling screw 52A in a secured or inserted position relative to the cutting insert 14. As seen, the coupling screw 52A is screw threaded into a female thread 78 of the cutting insert 14 and tightened against the coupling bore chamfer 50, while only the coupling screw abutment surface 76 engages the coupling bore chamfer 50.

The cutting tool body 12 further includes one or more holding bores 88 for receiving one or more holding members 80. In the embodiment shown, there are two holding bores (88A and 88B) with each receiving a respective holding member (80A and 80B). Each holding bore 88 receives at least one holding member 80 (or a portion thereof) which is held therein such that the holding member 80 (e.g., screw thread contacting portions of the holding member 80) can move in a generally radial direction, perpendicular to the coupling screw rotation axis R. The holding bores can advantageously extend at, and form, a holding angle $\theta$ with respect to the tool axis A. In most embodiments, the holding member 80 has very little room to move in a direction parallel to the coupling screw rotation axis R direction since it is designed to hold the coupling screw 52 from moving in the coupling bore axis B direction. At least in the non-secured position, the holding member 80 engages the coupling screw thread 60. Specifically, a portion of the holding member 80 is located in, and/or engages a thread recess 62 of the coupling screw thread 60. The holding member 80 of the embodiment shown in FIGS. 1 to 5 has a unitary, one piece (monolithic) construction. The holding member 80 is preferably made from a single material, such as e.g., steel. The holding member 80 can be manufactured e.g., via injection molding, form pressing, 3D printing, extrusion or punching/bending. The holding member 80 is preferably elastic, however it can also be non-elastic and elastically secured, and held in the cutting tool body 12 such that it performs at least two basic functions, as will be explained below. The terms 'holding' or 'hold' are used in a sense that a non-binding, or elastic, relationship exists between e.g., the holding member 80 and the coupling screw 52. Contrary thereto, the terms 'secure' or 'secured' are used in a sense that a binding, or coupling, relationship exists between, e.g., the tightened coupling screw 52 and the cutting insert 14.

Attention is drawn to FIG. 5. The holding member 80 has at least the following two functions.

The first function of the holding member 80 is to generate, at the coupling screw 52, a reaction force RF against an external force EF. As the name suggests, the reaction force RF is equal in magnitude, and directed in an opposite direction, to the external force EF.

For simplifying discussion in the present application, the external force EF is defined only axially, in the direction of the coupling screw rotation axis R. Furthermore, the external force EF is defined at least as a component, or a sum, of one or more external forces which are applied onto the coupling screw 52. The external force EF can be directed either in a first direction D1—away from the pocket 16, or in an opposite, second direction D2—towards the pocket 16 (both along the coupling screw rotation axis R). For example, the external force EF can be at least a component of gravity, or a force applied by hand via a driving tool 44 (such as a ALLEN™ driver or TORX™ driver as per U.S. Pat. No. 3,584,667).

The magnitude of the reaction force RF that the holding member 80 can generate is defined as equal to, or lower than, a predetermined maximum holding force MHF, as will be explained below. As previously mentioned, the reaction force RF is generated at the coupling screw 52, by the holding member 80, which can have various abutment surface geometry, and therefore can apply a force, or forces in one or more locations and/or directions, per the orientation of the abutment/engagement surfaces. Therefore, in order to simplify the explanation, the present subject matter focuses mainly on the forces which operate only in the axial direction (coupling screw rotation axis R).

One advantage of the first function is simply to prevent the coupling screw 52 from falling from the cutting tool body 12, e.g., when cutting tool 10 is held such that the first direction D1 is directed towards the floor, and therefore most of the external force EF equals gravity. For example, as seen by the right side of FIG. 5, the retention forces of the holding member 80B include the D2 directed forces generated by that holding member's 80 contact locations on the side walls of the thread groove 62 in the coupling screw 52B (since, unlike the illustrated coupling screw 52A, which is threadably received in the threaded bore of cutting insert 14, the coupling screw 52B is in the non-inserted position, and thus free from a threaded connection with the cutting insert 14, and would be prone to drop out under gravity but for holding member 80). As also seen from the above discussion, the maximum holding force MHF is therefore always larger than Gravity.

Another advantage of the first function is that it ensures proper attachment, or coupling (to generate holding forces applied on the coupling screw 52) during initial coupling between the driving tool 44 and the first or second driving members 68, 70 of the coupling screw 52. In other words, the position of coupling screw 52 is maintained by holding member 80 so as to facilitate initial engagement between the applicable one of the driving members 68 and 70, and the driving tool 44.

Yet another advantage of the first function is that it also dynamically (adaptive reactive force) ensures coupling, or attachment, forces applied on the coupling screw 52 during turning of the coupling screw 52 by the driving tool 44. Put differently, when the driver is used to turn the coupling screw 52, the holding member 80 pushes, or pulls back (depending on motion direction, applying the reaction force RF,), at least partially, the external force EF (possibly constantly fluctuating) applied by the driving tool 44 onto the coupling screw 52, which prevents it from moving away, or detaching, from the driving tool 44. This is true for both the first and second directions D1, D2.

An even further advantage of the first function is that it helps the user screw thread the coupling screw 52 into the female thread 78. Specifically, the holding member pushes or biases the coupling screw thread 60 towards the female thread 78 of the cutting insert 14, in a specific scenario where the driving tool 44 engages the second driving member 70 (i.e., when the user needs to access the coupling screw 52 from the 'insert side' of the cutting tool 10). Specifically, with reference again to the right side of FIG. 5, there can be seen that without the presence of the holding member 80, when the driving tool 44 begins to rotate the coupling screw 52, the driving tool would naturally either push the coupling screw 52 in the first direction D1 (away from the insert) or the coupling screw 52 would stay in its current axial position. In any case, the coupling screw 52 would not move in the second direction D2 (towards the insert) as desired. However, thanks to the reaction force RF, the holding member 80 acts as a temporary/dynamic female thread, and therefore rotation alone of the coupling screw 52 can enable the holding member 80 to push it back in the second direction D2—towards the female thread 78 in the cutting insert 14, since the holding member 80 has almost no room to move axially (in the first or second directions D1, D2). This enables the user to screw thread the coupling screw 52 in the female thread 78 of the cutting insert 14 with a minimal, or no effort at all.

The second function of the holding member 80 is to allow the coupling screw 52 to axially move in the direction D1 or D2 in the tool coupling bore 42 without turning—only when the magnitude of the external force EF exceeds the maximum holding force MHF. Specifically, the second function is achieved by a radial movement of the holding member 80, which can be described as a jumping motion of the holding member 80 between the thread recesses 62 (usually adjacent) along the coupling screw thread 60. This motion can sometimes emit a clicking sound. In other words, the holding member 80 elastically yields, bends, or simply moves out of (outwardly away from the coupling screw rotation axis R) the current thread recess 62 and enters back, or move into (moves inwardly, towards the coupling screw rotation axis R) the next thread recess 62 to allow said non-turning axial movement of the coupling screw 52 in the tool coupling bore 42. This motion is made possible since the holding member 80 is elastic, or elastically held, and can move in a radial direction (towards, or away from, the coupling screw rotation axis R). As will be explained below, the cutting tool body 12 is designed to allow said movement (e.g., movement radially inward and outward with respect to the coupling screw 52) of the holding member 80, and also to prevent axial movement thereof. Put simply, when the external force EF is too high, the coupling screw thread 60 pushes the holding member 80 outwards. An example of this non-turning axial movement of the coupling screw 52 relative to the holding member 80 can be seen in a comparison of the right and left side of FIG. 5. For example, after an old cutting insert 14 is removed and a new one positioned for securement, the coupling screw 52B would be in the appropriate position at this stage of the cutting insert assembly process (the left side would also be in the same position state as the right side of this stage instead of the secured position featured on the left side of FIG. 5). Thus, an assembler needs only to connect the driving tool 44 to coupling screw 52B and rotate to achieve movement of the coupling screw in direction D2, since the holding member 80 provides for threaded axial movement of the coupling screw along axis A until coming into a threading engagement with respect to the insert coupling bore 106 of the cutting insert 14.

One advantage of the second function is to prevent damage (e.g., plastic deformation), to either the coupling screw thread 60 and/or to the holding member 80.

According to the present subject matter, there can be several, geometrically distinct embodiments, or variants, of arrangements that produce the abovementioned advantages.

Figure 8:
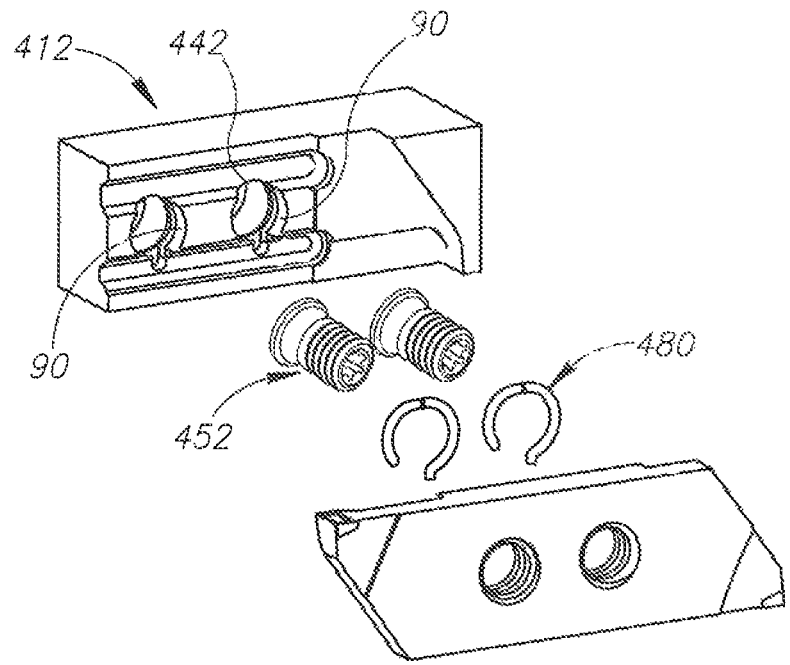
FIG. 8 is an isometric exploded view of a fourth embodiment of the cutting tool showing two O-ring shaped holding members and corresponding holding recesses.

Depending on the embodiment, the cutting tool body 12 (or 412) includes holding bore or bores 88, or holding recess or recesses 90 (FIG. 8). Each holding bore 88 or holding recess 90 is/are configured to secure the respective holding member/s 80 (412), while allowing some freedom of movement to perform said first and second functions. Specifically, the holding bore 88 and/or the holding recess 90 include radial gaps 92 which allow the holding member 80 (412) to move as explained above regarding the second function.

In this regard, attention is drawn to FIGS. 1 to 5, wherein, according to a first embodiment, the cutting tool body 12 includes two through holding bores 88. Each holding bore 88 (associated with a tool coupling bore 42) can open out to the tool peripheral surface 26 and to the respective tool coupling bore 42. In other words, the holding bore 88 opens into, and thus intersects, a tool coupling bore 42. The holding bores 88 are non-threaded. Each holding bore 88 is shown in this embodiment as accommodating a single holding member 80, and is shaped accordingly. In other words, each holding bore 88 is shaped to correspond to an external shape of the holding member 80, and functions as a housing for the holding member 80. According to the first embodiment, the holding member 80 is U-shaped and holds a single coupling screw 52, and the entirety of holding member 80 is received within holding bore 88 such that holding member 80 is received entirely within the peripheral boundary of peripheral surface 26.

Figure 3:
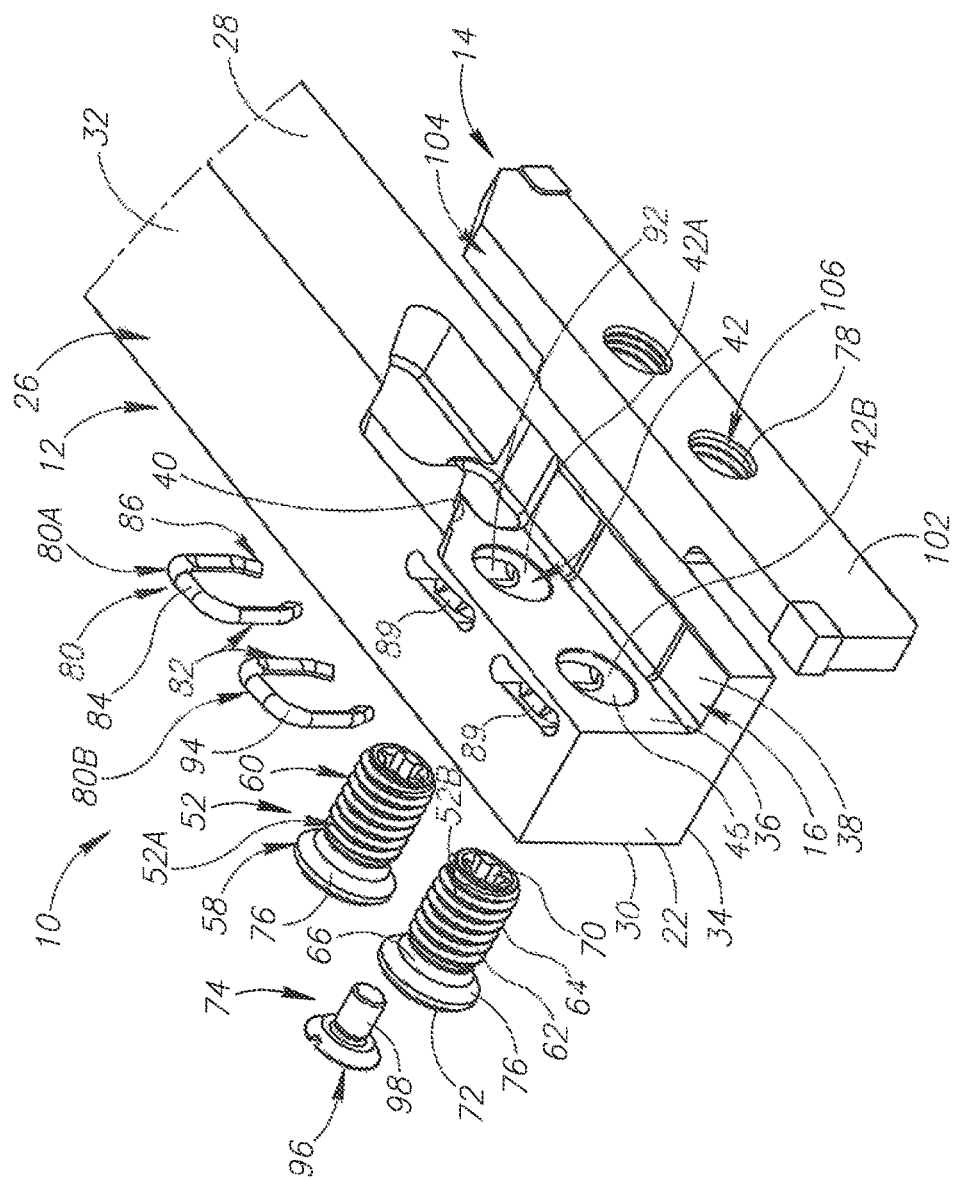
FIG. 3 is an isometric exploded view of the cutting tool of FIG. 1.

According to the first embodiment, the U-shaped holding member 80 is elastic/resilient, and includes two opposite holding arms 82 connected via a connecting portion 84. Each holding arm 82 can have a holding arm end 86 which is slanted towards the opposite holding arm 82 and can prevent the holding member 80 from exiting the holding bore 88 (e.g., the inward slanted holding arm ends 86 provide a partial wrap around function relative to the coupling screw received between the opposed holding arms 82, which in a non-outward flexed state have a preferred spread apart distance conforming with the diameter of the coupling screw to the extent of extension of the holding arm 82 into a thread recess 62 as described above and below). The inclusion of the inward extending holding arm ends 86 can thus advantageously provide better grip and match the shape of the coupling screw thread 60. In some embodiments, such as the embodiment of FIGS. 1 to 5, the holding bore 88 is provided with a bridge 89 (FIG. 3) that is positioned within holding bore 88. The bridge 89 can be a portion of the tool body 12 that is retained while the holding bore 88 is formed (e.g., the bridge 89 is a non-machined away portion of the cutting tool body 12 into which the bore 88 is machined). In the FIG. 1 embodiment the bridge 89 has opposite ends spaced from respective bore side walls of the cutting tool body that help define radial gaps 92. Thus, while holding arms 82 (and associated holding arm ends 86) can freely pass along the radial gaps 92 into position relative to the coupling holes 42, the connecting portion 84 of the holding member 80 is blocked from passage past the bridge 89. Also, the blocking surface of bridge 89 is shown as being deep enough within bore 88 such that the holding member 80, once in its operational position, is positioned fully at or below the peripheral surface 26 of the cutting tool body 12. Also, once the holding arm ends 86 are inserted into their operational position within bore 88, they are flexed inward below bridge 89 as to prevent the holding member 80 from falling out of the holding bore 88 if, e.g., the coupling screw 52 is replaced. Each holding arm 82 can have a triangular cross section (with triangular shaped cross-section of the holding arm 82 inclusive of the tear drop shaped cross-section featured in the cross-section shown in FIG. 5, with the vertex of the tear drop shape designed to enter in the coupling screw's thread recess 62, and the rounded portion designed for coming to or adjacent to the receiving side walls of bore 88 upon a maximum expansion or separation of the holding arms 82 during the aforementioned holding arm 62 radial adjustment between the coupling screw 52 and the bore's is adjacent side wall partially defining the radial gap 92). The triangular shape is well suited for matching a corresponding thread recess 62 of the coupling screw thread 60 (as shown in FIGS. 3 and 5). According to the first embodiment, and as mentioned earlier, the holding bores 88 are advantageously oriented transversely to the tool axis A in cross sectional view of the holding member 80 (FIG. 5). Specifically, the holding bores 88 can form the holding angle θ with the tool axis A. Therefore, the holding arms 82 can remain coplanar and therefore better correspond with the coupling screw thread 60. Put differently, if the holding member 80 is placed on a flat/planar surface, both holding arms 82 would touch that surface. Such an orientation enables a better fit, and ensures that the holding members 80 are well-received within the spiral coupling screw thread 60. Therefore, the transverse orientation of the holding bore 88 relative the tool axis A enables the holding arms 82 to engage the coupling screw thread 60 recess at two different locations (usually on opposite sides of the coupling screw rotation axis R), while the holding arms 82 remain coplanar. In the non-secured position, while no external force is applied onto the coupling screw 52, both holding arms 82 can engage the coupling screw thread 60. A minimum diameter measured at the base of the recess 62 of the coupling screw thread 60 can be larger than a minimum distance between the holding arms 82 in a relaxed position, which can enable some degree of elastic pre-tension in the holding member 80 when it engages the coupling screw 52 in the non-secured position. Also, the coupling screw thread 60 is shown in the "classic" sense in that the coupling screw thread 60 has an uninterrupted, 360° helical thread (defining recesses 62 and protrusions 64), which threading runs axially continuously from the coupling screw neck 66 (if present) to the second screw end surface 56, Variations are also possible relative to threading of the coupling screw 52 as in breaks in threading either relative to the coupling screw 52 circumference and/or axial length with the proviso that the coupling screw's thread recesses 62 are appropriately positioned relative to the associated holding member 80 to achieve the "first" and "second" functions described above (e.g., sufficient holding member 80 contact with the coupling screw threading during a time when the coupling screw 52 is not in a threaded engagement with the female thread 78 of cutting insert 14).

The cutting tool 10 can include the locking screw 74, which is configured to prevent unintentional removal of the coupling screw/s 52 from a respective tool coupling bore 42. The coupling screw 52 therefore never inadvertently protrudes from the tool peripheral surface 26. For example, in a scenario where the coupling screw 52 is pushed (if EF>MHF such that the holding member 80 releases at least temporarily) and/or turned such that the coupling screw 52 proceeds in the axial direction D1 until it would be capable of exiting the tool coupling bore 42 entirely, were it not for the locking screw 74, the locking screw 74 provides a blocking function that precludes inadvertent release of a coupling screw 52. According to some embodiments, the locking screw 74 has a locking screw head 96 connected to a cylindrical locking screw thread 98. The locking screw head 96 has a larger diameter than the locking screw thread 98. The tool peripheral surface 26 can include a locking bore 100 which includes a female thread. The locking bore 100 is located very close to the tool coupling bores 42, and the locking screw 74 is screw threaded into the locking bore 100 such that the locking screw head 96 partially overlaps the tool coupling bore 42, or both tool coupling bores 42. When the locking screw 74 is tightened, the locking screw head 96 does not protrude from the tool peripheral surface 26 (e.g., the locking screw head 96 is received in a corresponding countersunk recess formed in peripheral surface 26). In the abovementioned scenario, the locking screw head 96 can engage the coupling screw locking surface 72 preventing said unintentional removal of the coupling screw 52 from the tool coupling bore 42. Also, in the embodiment shown in FIG. 5, the bores 42 are arranged sufficiently close together as to enable the single locking screw 76 to prevent the noted unintentional removal of both the coupling screws 52. It should also be noted that, without the locking screw 76, and with coupling screw in a non-inserted state, the holding member 80 is still able to retain the coupling screw 52 unless some force arises that can overcome the holding capability of the holding member 80 on the coupling screw 52 (EF>MHF).

The cutting insert 14 can be indexable. As shown in FIGS. 1 to 5, the cutting insert 14 includes opposite insert base surfaces 102 and an insert peripheral surface 104 which extends therebetween. The cutting insert 14 has at least one, insert coupling bore 106 with an insert bore axis C, and preferably a number of insert coupling bores 106 conforming with the number of the coupling screws 52 utilized. The insert coupling bore 106 is also shown as having the female thread 78 for receiving a protruding coupling screw 52 in binding fashion. The insert coupling bore 106 is a through bore, which opens out to both insert base surfaces 102. The female thread 78 of the insert coupling bore 106 is configured to receive the coupling screw thread 60. In a seated, or non-secured position of the cutting insert 14 in the pocket 16, the tool and insert coupling bores 42, 106 can be eccentric (shown in FIG. 5, where the coupling bore axis B is not co-axial with the insert bore axis C in the non-secured position). With respect to such eccentricity, the abovementioned first function of the holding member 80 can advantageously help reduce screw threading times, due to multiple attempts to blindingly screw thread 60 the coupling screw 52 (the two threads, and specifically the initial contact area therebetween cannot be seen from outside the cutting tool when the insert is seated in the pocket 16, as shown in FIG. 5).

In the secured position, an insert base surface 102 abuts the pocket base surface 36, the insert peripheral surface 104 respectively abuts the first and second support walls 38, 40 and the coupling screw 52 is screw threaded into the female thread 78 and tightened against the coupling bore chamfer 50. In this position, according to the first embodiment, the holding member 80 does not engage the coupling screw thread 60 and engages the coupling screw neck 66.

The coupling screw thread 60 can be made from a stronger material than that of the female thread 78. Therefore, the coupling screws 52 are advantageously rarely worn, and relatively rarely need replacement.

The method of replacement or indexing of cutting insert 14 can include the following steps: (1) unscrewing the coupling screw(s) 52 from a desired first or second end 54, 56 of the coupling screw 52 (and with retention of the locking screw 74 in place), (2) inserting the replacement cutting insert 14 (or indexing of the seated cutting insert 14) into the pocket 16, (3) threading, or screwing, the coupling screw(s) 52 in the corresponding female thread 78 in the cutting insert 14 (again, with the holding assistance provided by the holding member 80 at least until threading is initiated between female thread 78 and coupling screws 52) until binding is achieved (e.g., until firm contact is achieved between the coupling screw 52 and the coupling bore chamfer 50. Also advancement of each coupling screw into each of the secured or non-secured positions, is designed in this embodiment for being carried out with an appropriate driving tool 44 (as in a more accessible side of the tool body 12).

Figure 6:
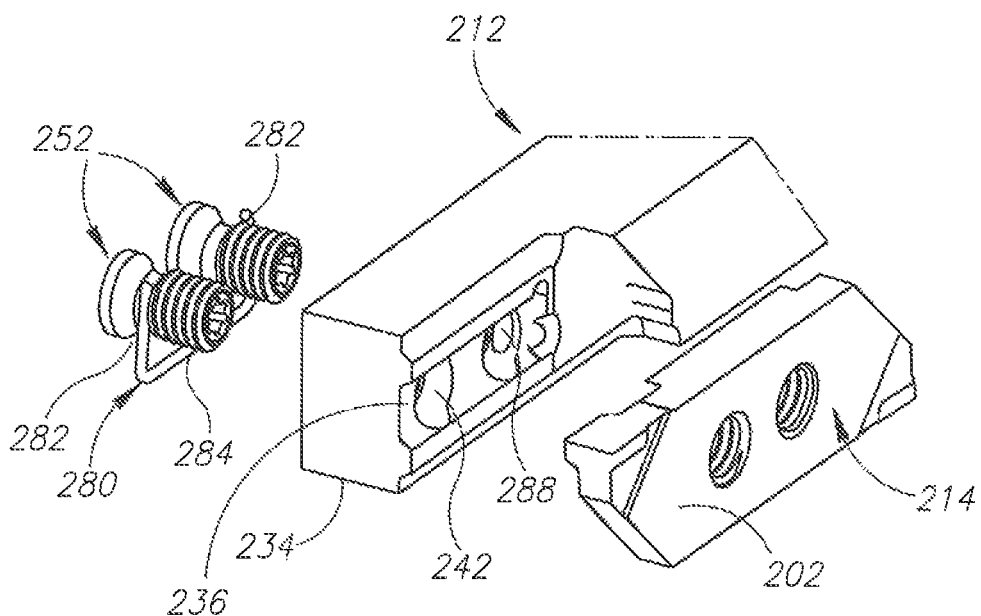
FIG. 6 is an isometric exploded view of a second embodiment of the cutting tool showing a single trapezoidal-shaped holding member and two coupling screws.

Attention is drawn to FIG. 6. According to a second embodiment, the cutting tool body 212 has only a single elastic/resilient holding member 280 (or holding means 280, which like holding means 80, functions to hold the relative relationship between the coupling screw(s) 52 and the holding means 80 in the manner described above relative to the "first and second" functioning capabilities of the holding member(s) 80). The holding member 280 has a wide, open trapezoidal shape that can engage, and hold two coupling screws 252 simultaneously. Specifically, the connecting portion 284 is long enough such that each holding arm 282 engages a different coupling screw 252. According to the second embodiment, the cutting tool body 212 has two holding bores 288, each of which opens out to the tool fourth surface 234 and to a respective tool coupling bore 242, which it intersects. Each holding arm 282 is located in a different holding bore 288 (opening out to the tool fourth surface 234) and can have a circular cross section. The two holding arms 282 are far enough from each other to accommodate two coupling screws 252. Each coupling arm engages a single coupling screw 252, and provides the aforementioned "first" and "second" functions when in that engaged state.

FIG. 6 further shows cutting insert 214, which in this embodiment is an indexable cutting insert in that each end of the cutting insert has a cutting edge. For example, the indexing (or total replacement) of the cutting insert 214 can be carried out via a method involving unscrewing the coupling screw(s) 52 (from either side of the cutting tool body 212), inserting the indexed cutting insert 214 (or a new cutting insert 214) and then screwing the coupling screw(s) 52 in the corresponding engagement areas in the cutting insert 214 (with the assistance provided by the retention from the holding member 280) until coupling is achieved. Each of the coupling screw retraction into a non-insertion state, or advancement into secured position is designed in this embodiment for being carried out with an appropriate tool, as in the driving tool 44, and relative to a desired side of the cutting tool 10 for ease of access. Also, in FIG. 6 there is utilized common end reference numbering with an added "200" hundreds demarcation such that, for example, cutting tool body 12 in FIG. 1 generally corresponds with cutting tool body 212 in FIG. 6.

Figure 7:
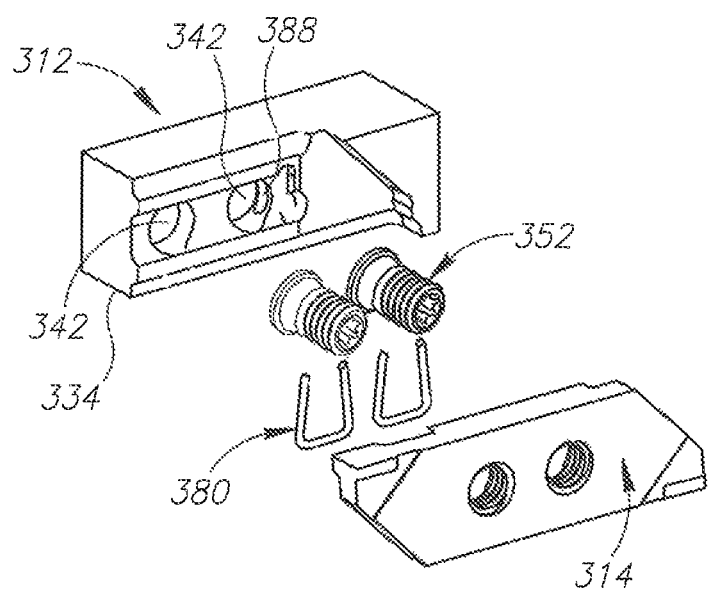
FIG. 7 is an isometric exploded view of a third embodiment of the cutting tool showing two holding members and holding bores opening at a bottom of the cutting tool.

Attention is drawn to FIG. 7. According to a third embodiment, the cutting tool body 312 has two elastic/resilient holding members 380 (representing the holding means 380 in this embodiment), each of which has an open, trapezoidal shape. According to the third embodiment, the cutting tool body 312 has two holding bores 388, each of which opens out to the tool fourth surface 334 and intersects a respective tool coupling bore 342, which it intersects. Each holding member 380 is located in a respective holding bore 388, and in a non-secured position, engages each coupling screw 352 at two locations.

Attention is drawn to FIG. 8. According to a fourth embodiment, the cutting tool body 412 has two holding recesses 90 and two elastic/resilient holding members 480 (with members 480 providing the holding means 480 in this embodiment) located respectively therein. Each holding member 480 can be shaped as an open O-ring with a gap. Each holding recess 90 can be located with each tool coupling bore 442 and can open out to the pocket base surface 436. The holding recess 90 is configured to hold the holding member 480 in place.

Figure 9:
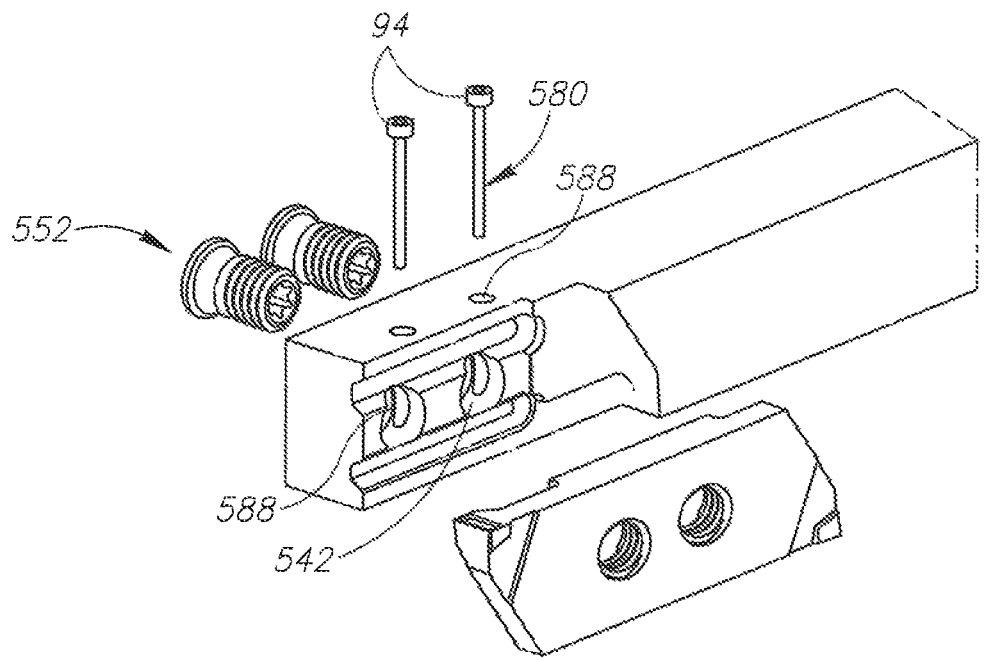
FIG. 9 is an isometric exploded view of a fifth embodiment of the cutting tool showing pin-shaped straight holding members.

Attention is drawn to FIG. 9. According to a fifth embodiment, the cutting tool body 512 has two holding bores 588 and the two holding members 580 (with members 580 and associated elastic components 94 representing the holding means 580/94 of this embodiment). As shown, each holding member 580 is located in a holding bore 588 and has a straight pin shape. Each pin-shaped holding member 580 engages a respective coupling screw 552 at only a single location (e.g., within a thread groove region on one side of the coupling screw 552). Each holding member 580 can be rigid, and held in the holding bore 588 via a flexible member 94, such as a rubber ring (which flexible member 94 is received in holding bore 588 as to elastically secure the holding member 588 in position, while also allowing the holding member 588 to release from its engagement with thread grooves of the coupling screw 552 and return into the threading or a neck region of the capping screw 552). Alternatively, each holding member 580 can be flexible, and e.g., rigidly attached in the respective holding bore 588.

Also, as seen from the above discussion, the holding means of the present invention can take a variety of forms in achieving the above described "first" and "second" functions. The above described holding means 80 (e.g., 80A, 80B); 280; 380 (e.g., 380A, 380B); 480 (e.g., 480A, 480B); 580/94 (e.g., 580A/94A, 580B/94B) represent a few embodiments suitable for providing the aforementioned "first" and "second" function of the holding means. Further, while some of the holding means associated with the two coupling screw sets include first and second holding members, as in holding members 80A and 80B, the holding means also includes only one holding member such as holding member 80A for situations where only one coupling screw 52 is utilized.

What is claimed is:

1. A cutting tool body (12) configured for securing a cutting insert (14) having a female thread (78) and comprising:
    a machining end (18) and a tool peripheral surface (26) extending therefrom;
    a through, non-threaded tool coupling bore (42) opening out to the tool peripheral surface (26); and
    a coupling screw (52) having a coupling screw thread (60) and being located in the tool coupling bore (42) and configured to secure the cutting insert (14);
    wherein the cutting tool body (12) further includes a holding member (80) which engages the coupling screw thread (60) at least when the holding member (80) is not in contact with the cutting insert (14), and wherein the holding member (80) protrudes into the tool coupling bore (42).

2. The cutting tool body (12) according to claim 1, wherein the holding member (80) is configured to prevent the coupling screw (52) from falling out of the tool coupling bore (42), and prevent it from moving away from a driving tool (44) during turning.

3. The cutting tool body (12) according to claim 1, wherein the coupling screw (52) comprises first and second driving members (68, 70) which enable turning the coupling screw (52) via a driving tool (44) from two opposite sides of the cutting tool (10).

4. The cutting tool body (12) according to claim 1, wherein the holding member (80) is not elastic, and resiliently secured to the cutting tool via an elastic member (94).

5. The cutting tool body (12) according to claim 1, wherein the holding member (80) is elastic.

6. The cutting tool body (12) according to claim 1, wherein the holding member (80, 380, 580) is U-shaped or straight.

7. The cutting tool body (12) according to claim 1, wherein at least portions of the holding member (80, 280, 380, 480, 580) have a triangular, or circular, cross-section.

8. The cutting tool body (12) according to claim 1, wherein the holding member (80, 280, 380, 580) is replaceable and releasably located within a through holding bore (88, 288, 388, 588) which intersects the tool coupling bore (42, 242, 342, 542).

9. The cutting tool body (12) according to claim 1, wherein the holding member (580) is replaceable and releasably located within a holding recess (90) in the tool coupling bore (542).

10. The cutting tool body (12) according to claim 1, wherein the cutting tool body (12) comprises a locking screw (74) which is threaded into a blind locking bore (100) opening out only to the tool peripheral surface (26).

11. The cutting tool body (12) according to claim 1, wherein the coupling screw (52) does not protrude outwardly from the tool peripheral surface (26).

12. The cutting tool body (12) according to claim 1, wherein the cutting tool body (12) includes two coupling screws (52) and a second tool coupling bore (42).

13. The cutting tool body (212) according to claim 1, wherein the cutting tool body (212) includes two coupling screws (252) and a single holding member (280) which engages both coupling screws (252) at least in a non-secured position.

14. A cutting tool (10) comprising the cutting tool body (12) according to claim 1 and a cutting insert (14) secured in a pocket (16) of the cutting tool body (12) via the coupling screw (52).

15. The cutting tool (10) according to claim 14, wherein the tool peripheral surface (26) comprises the pocket (16) in which the cutting insert (14) is seated, the pocket (16) comprises an outwardly facing pocket base surface (36) and support walls (38, 40) which extend therefrom;
    the cutting insert (14) comprises opposite insert base surfaces (102) and an insert peripheral surface (104) which extends therebetween.

16. The cutting tool (10) according to claim 14, wherein the cutting insert (14) comprises insert base surfaces (102), an insert peripheral surface (104), and at least one insert female thread (78), and wherein, in a secured position, one of the insert base surfaces (102) abuts the pocket base surface (36), the insert peripheral surface (104) abuts the first and second support walls (38,40) and the coupling screw (52) is screw threaded into the insert female thread (78) and tightened against a coupling bore chamfer (50).

17. The cutting tool body (12) according to claim 1, wherein the tool coupling bore (42) has a coupling bore chamfer (50) that extends radially inward within an intermediate region of the tool coupling bore (42) to define a contact location for a coupling screw head (58) of the coupling screw (52).

18. The cutting tool body (12) according to claim 1, wherein the tool coupling bore (42) is dimensioned such that the coupling screw (52) is retained, in its entirety, within the tool coupling bore (42) in a non-secured position.

19. A method of indexing or replacing a cutting insert (14) received in the pocket (16) of the cutting tool body (12) according to claim 1; the method comprising the steps of:
 a. unscrewing, with a driving tool, at least one coupling screw (52) threadably received within a female thread of the cutting insert (14) from a secured to a non-secured position;
 b. inserting a replacement cutting insert (14), or indexing the previously secured cutting insert (14);
 c. screwing the coupling screw (52) from the non-secured position to a secure position wherein the coupling screw (52) is threadably engaged in a corresponding female thread (78) in the cutting insert (14), and wherein a holding member (80) is in engagement with coupling screw thread (60) at least when the coupling screw (14) is in the non-secured position.

20. The method according to claim 19, wherein the method further comprises non-rotational axial movement of the coupling screw (52), whereby the holding member (80) adjusts relative to the coupling screw (52).

21. The cutting tool body (12) according to claim 1, wherein the tool coupling bore (42) is dimensioned such that the coupling screw (52) is fully retained within the tool coupling bore (42) when the coupling screw (52) is in the non-secured position.

22. The cutting tool body (12) according to claim 1, wherein the tool peripheral surface (26) comprises a pocket (16) in which the cutting insert (14) is seated, the pocket (16) comprises an outwardly facing pocket base surface (36) and first and second support walls (38, 40) which extend from the pocket base surface (36).

23. The cutting tool body (12) according to claim 1, wherein the holding member (80) applies a reaction force (RF) on the coupling screw (52) in a direction of a coupling screw rotation axis (R) which is equal or lower than a maximum holding force (MHF) which can cause plastic deformation in either the coupling screw (52) or the holding member (80).

24. A cutting tool body (12) configured for securing a cutting insert (14) having a female thread (78) and comprising:
 a machining end (18) and a tool peripheral surface (26) extending therefrom;
 a through, non-threaded tool coupling bore (42) opening out to the tool peripheral surface (26); and
 a coupling screw (52) having a coupling screw thread (60) and being located in the tool coupling bore (42) and configured to secure the cutting insert (14);
 wherein the cutting tool body (12) further includes a holding member (80) which engages the coupling screw thread (60) at least when the holding member (80) is not in contact with the cutting insert (14), and wherein the tool peripheral surface (26) comprises a pocket (16) in which the cutting insert (14) is seated, the pocket (16) comprises an outwardly facing pocket base surface (36) and first and second support walls (38, 40) which extend from the pocket base surface (36).

25. A cutting tool body (12) configured for securing a cutting insert (14) having a female thread (78) and comprising:
 a machining end (18) and a tool peripheral surface (26) extending therefrom;
 a through, non-threaded tool coupling bore (42) opening out to the tool peripheral surface (26); and
 a coupling screw (52) having a coupling screw thread (60) and being located in the tool coupling bore (42) and configured to secure the cutting insert (14);
 wherein the cutting tool body (12) further includes a holding member (80) which engages the coupling screw thread (60) at least when the holding member (80) is not in contact with the cutting insert (14), and wherein the holding member (80) applies a reaction force (RF) on the coupling screw (52) in a direction of a coupling screw rotation axis (R) which is equal or lower than a maximum holding force (MIHF) which can cause plastic deformation in either the coupling screw (52) or the holding member (80).

26. The cutting tool body (12) according to claim 25, wherein when RF=MIHF, the holding member (80) is configured to move, or jump, between thread recesses (62) of the coupling screw thread (60) to allow axial motion without rotation of the coupling screw (52).

\* \* \* \* \*